(12) United States Patent
Sasaki

(10) Patent No.: US 6,801,831 B2
(45) Date of Patent: Oct. 5, 2004

(54) METHOD FOR SETTING AN INJECTION SPEED CONTROL PATTERN OF AN INJECTION MOLDING MACHINE

(75) Inventor: Kiyoshi Sasaki, Shizuoka-ken (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 305 days.

(21) Appl. No.: 09/947,560

(22) Filed: Sep. 7, 2001

(65) Prior Publication Data

US 2002/0032500 A1 Mar. 14, 2002

(30) Foreign Application Priority Data

Sep. 8, 2000 (JP) ........................................ 2000-274234

(51) Int. Cl.[7] .............................................. B29C 45/00
(52) U.S. Cl. ........................ 700/200; 700/197; 700/203
(58) Field of Search ................................ 700/197, 183, 700/200, 203; 425/135, 150

(56) References Cited

U.S. PATENT DOCUMENTS

| | | | | |
|---|---|---|---|---|
| 5,738,809 A | * | 4/1998 | Hara et al. ................. | 264/40.5 |
| 5,792,483 A | * | 8/1998 | Siegrist et al. .............. | 425/135 |
| 5,911,924 A | * | 6/1999 | Siegrist et al. ............. | 264/40.1 |
| 6,338,004 B1 | * | 1/2002 | Usui .......................... | 700/200 |

* cited by examiner

Primary Examiner—Leo Picard
Assistant Examiner—Carlos R. Ortiz
(74) Attorney, Agent, or Firm—Pillsbury Winthrop LLP

(57) ABSTRACT

In an injection molding machine utilizing a setting method of the present invention, there is substantially no limitation in the numbers of steps of an injection speed and a holding pressure, and in addition to rectangle, slope, polygonal line and flat, an arc can be designated as a shape mode. Because of using codes to define the shape mode, the setting operation becomes easy. In order to form one injection speed control pattern, a mix of shape modes may be utilized. Also, in the present setting method, a plurality of code data predeterminedly defined are input sequentially in time, thereby setting the injection speed control pattern or pressure holding control pattern. The code defines a kind of function which figures out an injection speed command data or a holding pressure command data corresponding to each stroke position or time.

9 Claims, 14 Drawing Sheets

INJECTION SET   PROD CODE   01/07/03  16:43   RUN

HOLDPRESS CNTRL   FILL PRESS STEP   CAV PRESS CALIB   INJ BOOST OFF·ON

STD·PTP SLOP1·2·3     2     300.00 MPa     NOZZLE RET TIME   TRLS6  U.U  S

HOLD SPD STEP   FPC MODE   FILL SPD STEP   FILL SPD CTRL   FILL SPEED

1·2   LS4·HYD CAVITY·EXT   10   STD·PTP SLOP1·2·3   STD·x2·x4

FPC MONITOR   BINARY MODE   HOLD   FILL   SHUT OFF NOZZLE

HYDRAULIC POSITION     1·2·3· 4·5·6·7     1·2·3· 4·5·6·7     OFF·AUTO ·OPEN

INJECT   INJ PRFL   CHARGE   CHG·PRFL   VENT   COPY

*FIG. 8*

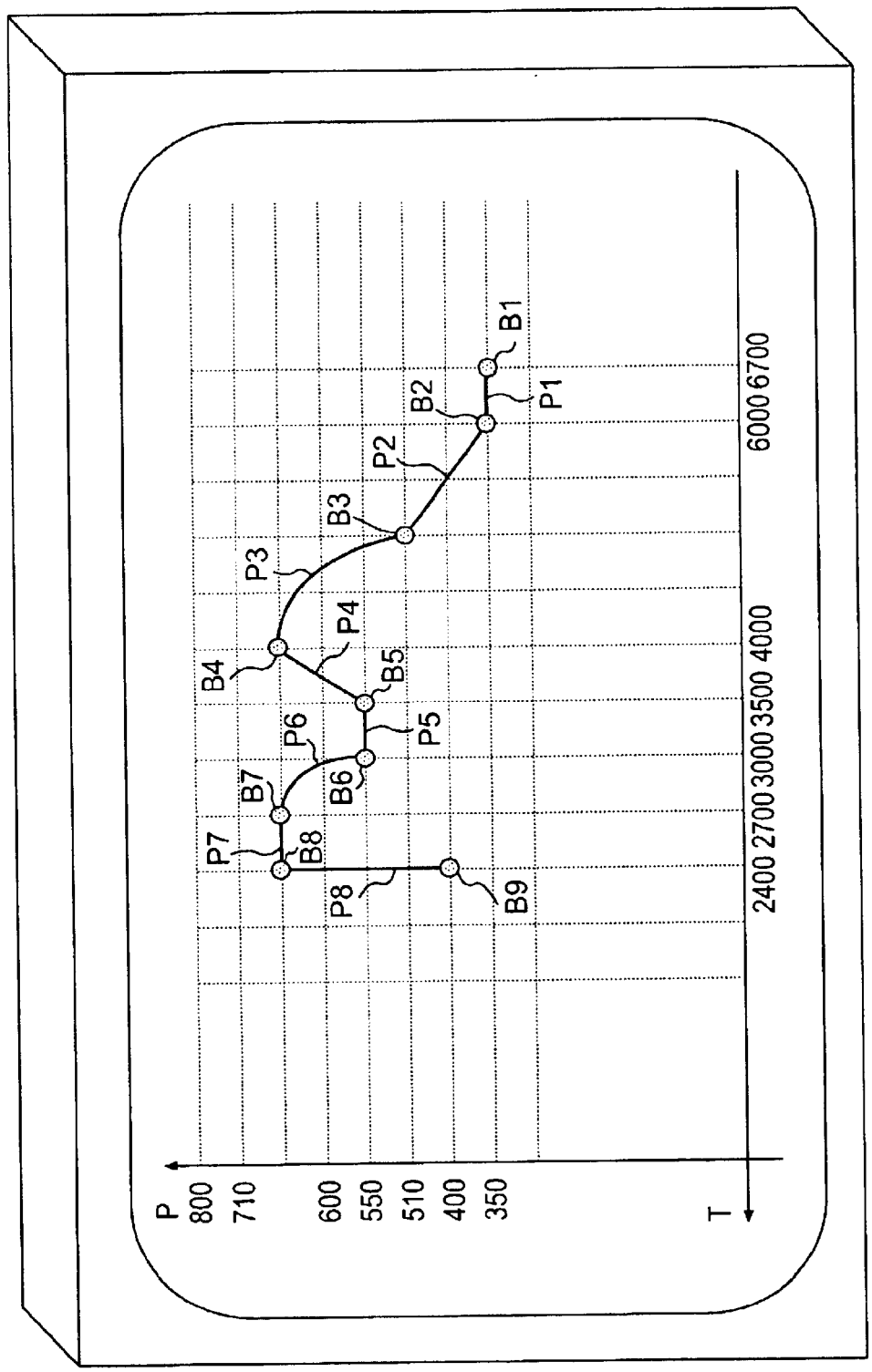

METHOD FOR SETTING AN INJECTION SPEED CONTROL PATTERN OF AN INJECTION MOLDING MACHINE

BACKGROUND

The claimed inventions relate to injection control methods of an injection molding machine, specifically to a programming method for setting input data by using functions for defining injection speed and pressure control pattern profiles in order that a plurality of kinds of mold products are molded under an appropriate programmed injection control in a single injection molding machine.

In an injection molding machine, injection control conditions are generally determined in accordance with a predetermined control pattern profile. Namely, as shown in FIG. 3 to FIG. 5, injection speed VI of a filling process and holding pressure P of a pressure holding process are set in accordance with each control pattern profile on the predetermined number of steps.

In each figure there are 10 steps on injection speed necessary for operating one filling process, each step corresponding to the block VI 1 to the block VI 10 as shown in areas under the rectangle wave form in accordance with the stroke position in the process.

Also, there are 4 steps on holding pressure necessary for operating one pressure holding process, each step corresponding to the block PH1 to the block PH4 as shown in areas above the rectangle wave form in accordance with the time in the process.

As to the injection speed VI, there are 3 shape modes, that is, the rectangle mode, the slope mode and the polygonal line mode. The rectangle mode is shown in FIG. 3 as the rectangle wave, the slope mode is shown in FIG. 4 as the slope wave, and the polygonal line mode is shown in FIG. 5 as the polygonal line wave.

As to the holding pressure P, only the rectangle mode is defined as shown in FIG. 3 to FIG. 5.

Therefore, it is possible to improve the quality of mold products to an extent by selecting an appropriate one of the modes in view of the product characteristics in molding and setting data for injection control operation under the selected mode.

However, there exist problems to be solved in setting injection control program data mentioned above.

Namely, in the above conventional method of setting, because of conventional control system configuration, the numbers of speed or pressure changing steps in a filling process or pressure holding process are also limited to only 10 steps or 4 steps, respectively, and the numbers of shape modes are limited to three, that is, the rectangle, the slope and the polygonal line. However, much more steps and variety of shape modes are required in order to set a precise and fine injection control program.

SUMMARY

In part, the claimed inventions provide methods for setting injection control programs in which an operator is enabled to achieve input operations necessary for operating the filling and pressure holding processes without considering limitations in the numbers of steps.

The inventions also provide methods for setting injection control programs in which an operator is enabled to easily achieve input operations necessary for operating the filling and pressure holding processes by making use of a code corresponding to an input command data.

The inventions also provide methods for setting injection control programs in which an operator is enabled to use a plurality of shape modes even in one filling process or in one pressure holding process.

The inventions also provide methods for setting injection control programs in which an operator is enabled to easily modify injection control conditions already set for other mold products to improve quality and accuracy thereof.

More specifically, there is provided a method for setting an injection speed control pattern profile into a memory of a control apparatus of an injection molding machine, in which a series of stroke position command data necessary for operating one injection filling process are stored together with injection speed command data corresponding to each position, and a plurality of functions for producing each injection speed command data are also stored, the control apparatus controlling actual filling operations by reading out the stored data in the memory, the method includes the following steps of designating a plurality of co-ordinate points on a plane with co-ordinate axes of an injection stroke position and an injection speed, respectively, each as a point on the injection speed control pattern profile, defining a function suitable to a line connecting between two designated and adjacent points, such as a definite straight line or a sectional curve, the connecting line forming a portion of the pattern profile, defining the function as a function to produce the injection speed command data corresponding to injection stroke positions, calculating a plurality of injection speed command data corresponding to each the stroke position between the two designated points by using the function, and storing the calculated data in a first area of the memory.

The co-ordinate points in the designating step are constituted by a code data defined with a code name and its values corresponding to each co-ordinate axis, and the code data are stored in a second area of the memory.

Of course, the co-ordinate points can be directly input on the screen of pattern display in the control apparatus.

The sectional curve in the defining step may be an arc.

There is also provided a method for setting a holding pressure control pattern profile into a memory of a control apparatus of an injection molding machine, in which a series of time command data necessary for operating one pressure holding process are stored together with holding pressure command data corresponding to each time, and a plurality of functions for producing each holding pressure command data are also stored, the control apparatus controlling actual pressure holding operations by reading out the stored data in the memory, the method includes the following steps of designating a plurality of co-ordinate points on a plane with co-ordinate axes of the time and the holding pressure, respectively, each as a point on holding pressure control pattern profile, defining a function suitable to a line connecting between two designated and adjacent points, such as a definite straight line or a sectional curve, the connecting line forming a portion of the pattern profile, defining the function as a function to produce the holding pressure command data corresponding to each the time between the designated two points, calculating a plurality of holding pressure command data corresponding to each time by using the function and storing the calculated data in the first area of the memory.

The co-ordinate points in the designating step are constituted by a code data defined with a code name and its values corresponding to each co-ordinate axis, and the code data are stored in the second area of the memory.

Of course, the co-ordinate points can be directly input on the screen of pattern display in the control apparatus.

The sectional curve in the defining step may be an arc.

BRIEF DESCRIPTION OF THE DRAWINGS

The above and other features and advantages of the claimed inventions will be made more apparent from the description of preferred embodiments with reference to the accompanying drawings wherein:

FIG. 8 shows a screen for selecting an injection control pattern of shape mode in an embodiment of the claimed inventions;

FIG. 14 shows an output screen for displaying a relationship between each time and holding pressure set on the input screen of FIG. 11 in an embodiment of the claimed inventions.

DETAILED DESCRIPTION OF PREFERRED EMBODIMENTS

The control system of an embodiment of an injection molding machine of the claimed inventions will be explained below, referring the drawings.

Figure 1:
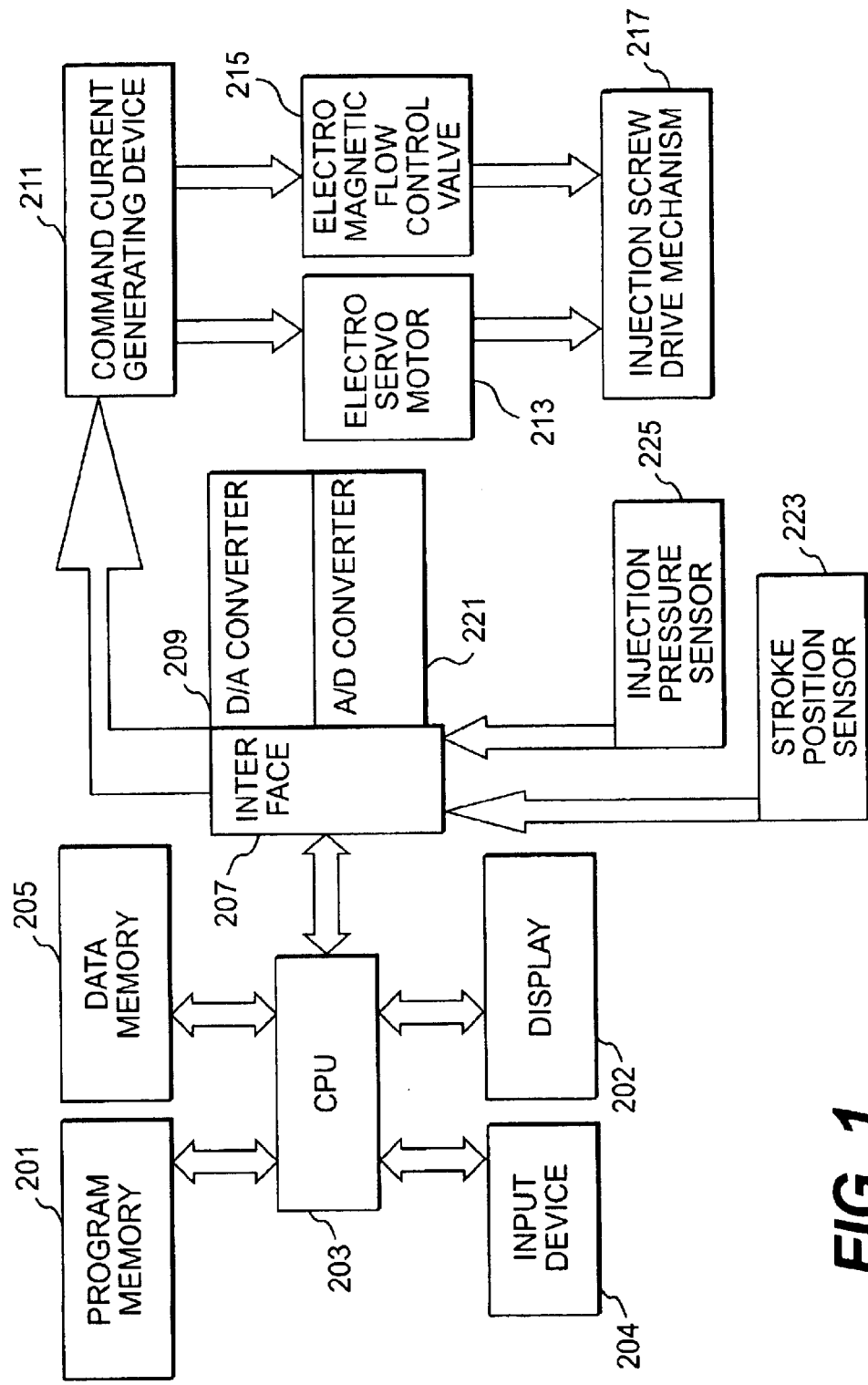
FIG. 1 is a general control system constitution of the injection molding machine of an embodiment of the claimed inventions.

FIG. 1 is a general control system constitution of the injection molding machine of an embodiment of the claimed inventions.

As shown in FIG. 1, in the computer control system of the injection molding machine there is provided a central processing unit (CPU) 203 as a core element for the computer control. The CPU 203 connects electrically with an input device 204, a display device 202, a program memory 201, a data memory 205 and an interface 207. The interface 207 connects electrically with a digital analogue converter (D/A converter) 209, an analogue digital converter (A/D converter) 221, a command current generating device 211, a stroke position sensor 223 and an injection pressure sensor 225. The command current generating device 211 connects electrically with an electric servo motor 213 or an electromagnetic flow control valve 215 through which a drive mechanism 217 of an injection screw is driven depending on whether the drive mechanism 217 is constituted by electric servo motor system or hydraulic system.

The CPU 203 controls the input device 204, the display device 202, the data memory 205 and the interface 207 on setting operation of injection control pattern data and actual drive control operation of the screw drive mechanism 217, under instructions stored in the program memory 201.

Firstly, when an order of conventional setting method is input through the input device 204 by an operator, the CPU 203 controls reading of an instruction program of the conventional data setting method and displaying of the read instruction program on the screen of the display device 202. Then, the displayed instruction program is confirmed such that no correction is necessary, and the operator inputs an order to execute the program through the input device 204. If some corrections are necessary, the program is corrected or modified before it is executed.

Secondly, in the case of inputting or setting in the way of embodiments of the claimed inventions, the input operation is done through the input device 204 with the use of a code.

In the filling process, the code is formed with a series of characters corresponding to a stroke position, pressure, an injection speed and a function. Also, in the process the code may be formed with only the position and the function. The code input is displayed on the screen of the display device 202. The CPU 203 selects functions such as rectangle, slope, polygonal line, circle and other named ones stored in the program memory 201 corresponding to each code, and inputs a position data in the code into the selected function as a variable number and calculates the value of the function. The output data by the calculation is stored in the data memory 205. The output data in the data memory 205 is utilized to control the screw drive mechanism 217 through the interface 207 when the operator orders the drive control operation.

Thirdly, the CPU 203 receives through the interface 207 a stroke position data from the stroke position sensor 223 and an injection pressure data from the injection pressure sensor 225, respectively, and saves the detected data on the data memory 205. When a difference between the detected data and reference data exists the CPU 203 issues controls so as to reduce the difference. The detected data are also displayed on the display device 202.

The input device 204 for inputting the codes, data and orders may include a keyboard, a mouse, a touch panel, a ten-key and any other means.

The display device 202 displays the code input data, present stroke position data, injection pressure data and programmed injection control pattern profiles. The display device 202 may include a CRT (cathode ray tube), a liquid crystal display, a plasma display, an EL (electro luminescence) display and any other display means.

The program memory 201 includes the conventional injection control program and mathematical functions for use with a code input arrangement.

Figure 2:
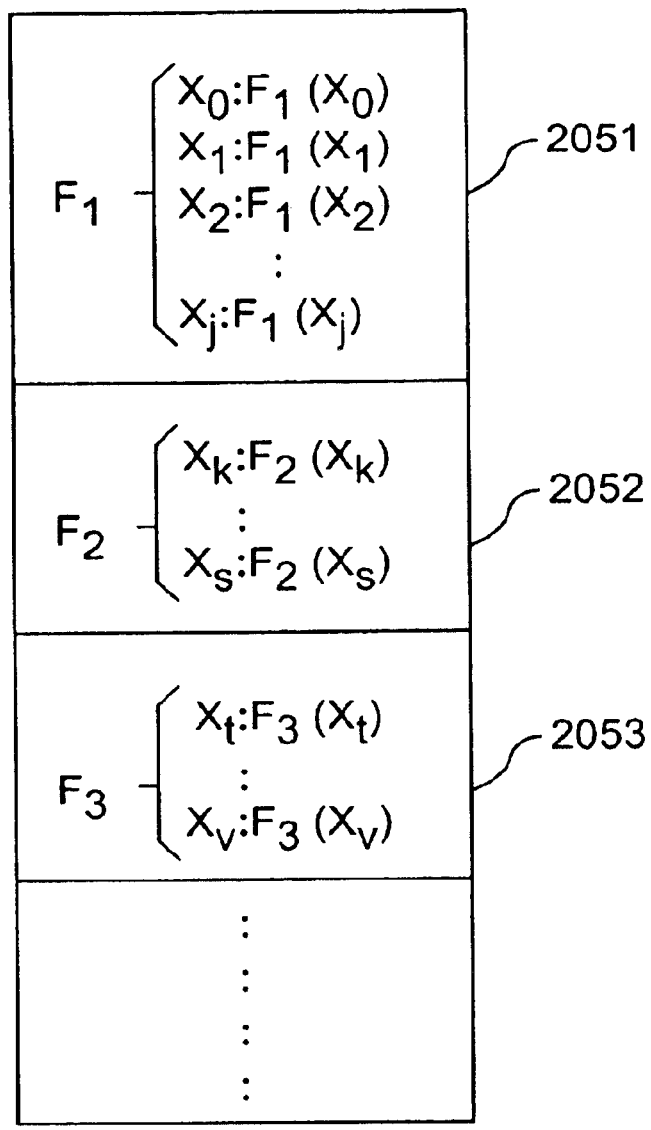
FIG. 2 shows a form of data memory in the control system in an embodiment of the claimed inventions.
Figure 3:
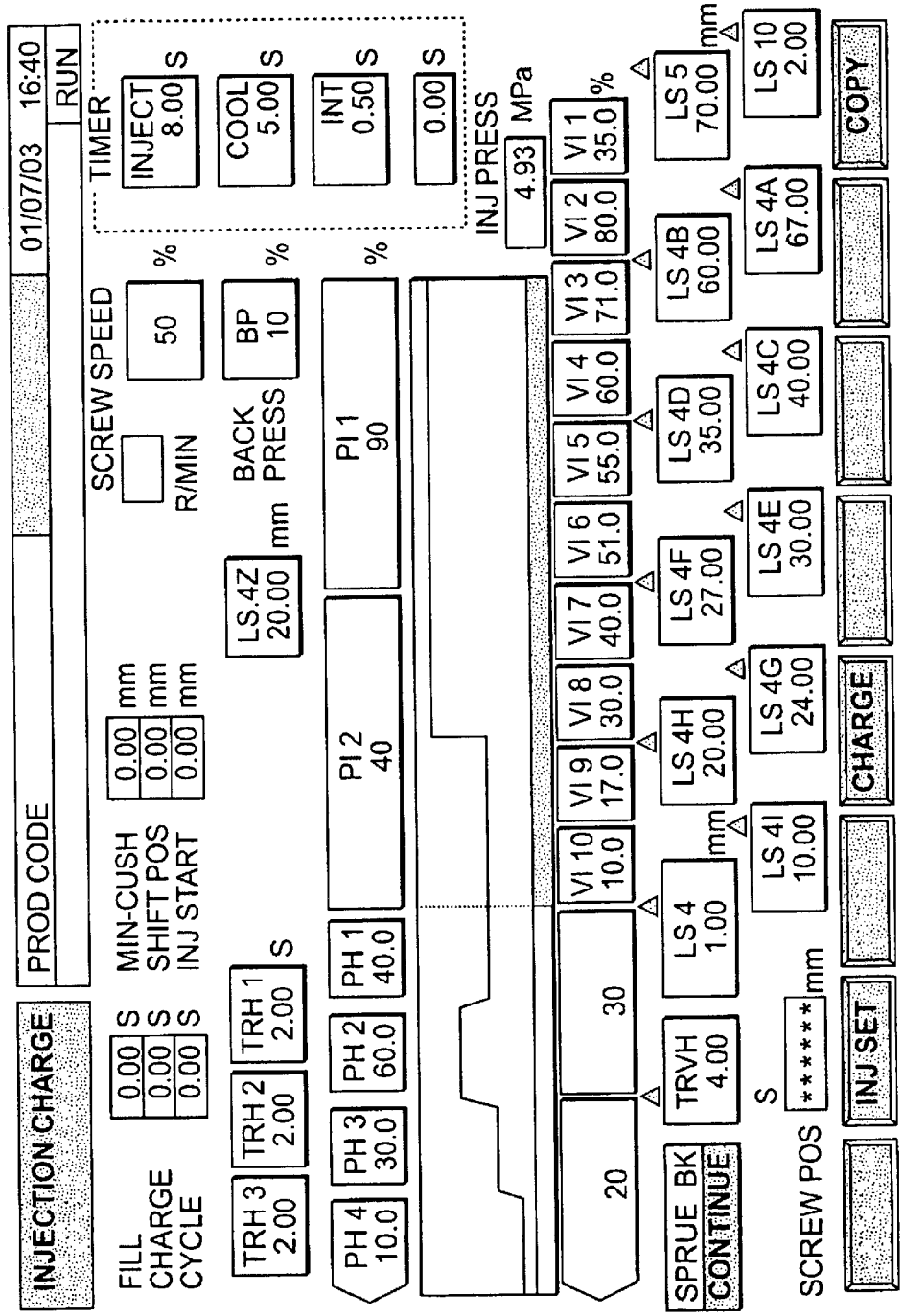
FIG. 3 shows a screen for setting an injection speed control pattern with the rectangle mode in the conventional control system of the injection molding machine.
Figure 4:
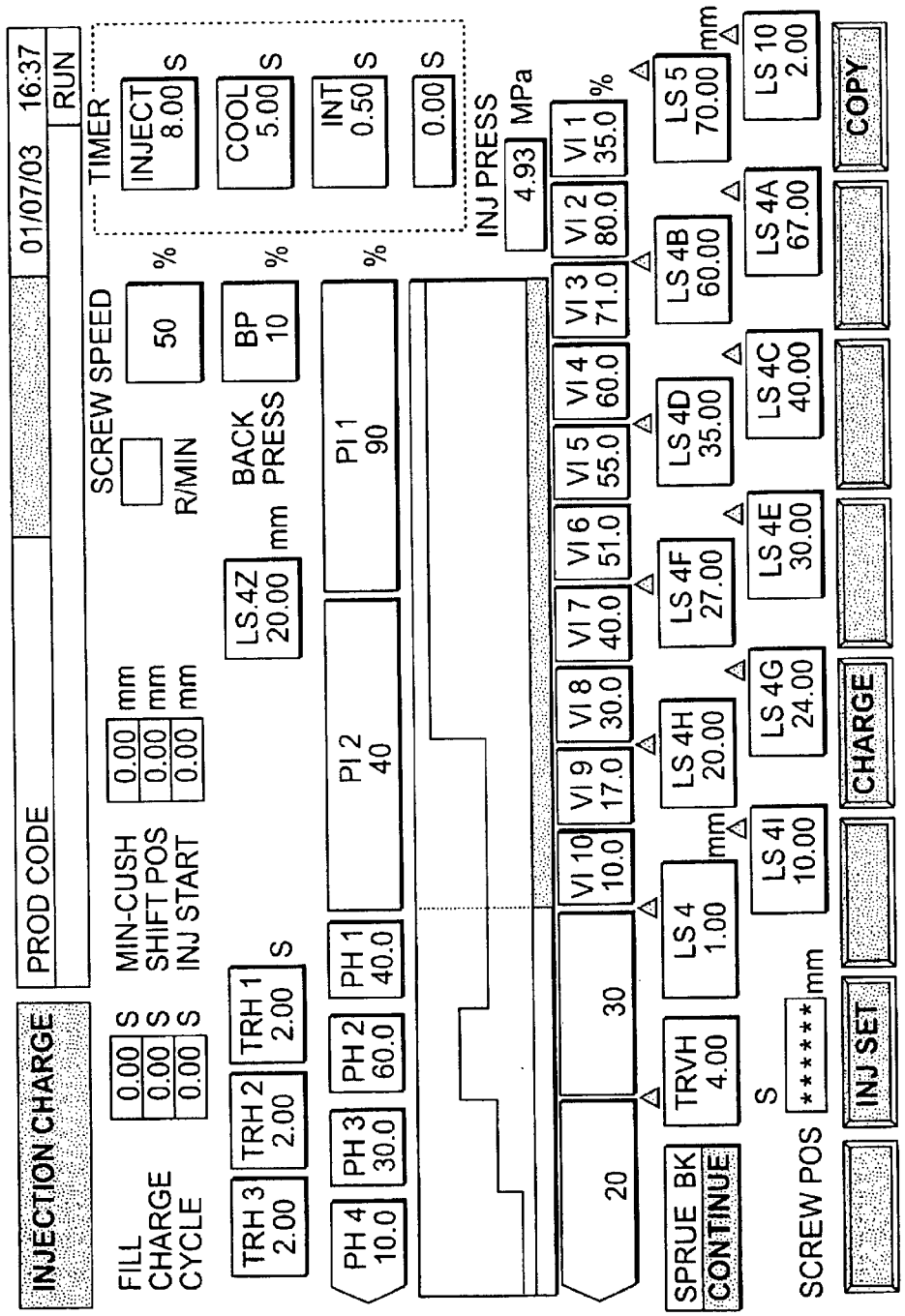
FIG. 4 shows a screen for setting an injection speed control pattern with the slope mode in the conventional control system of the injection molding machine.
Figure 5:
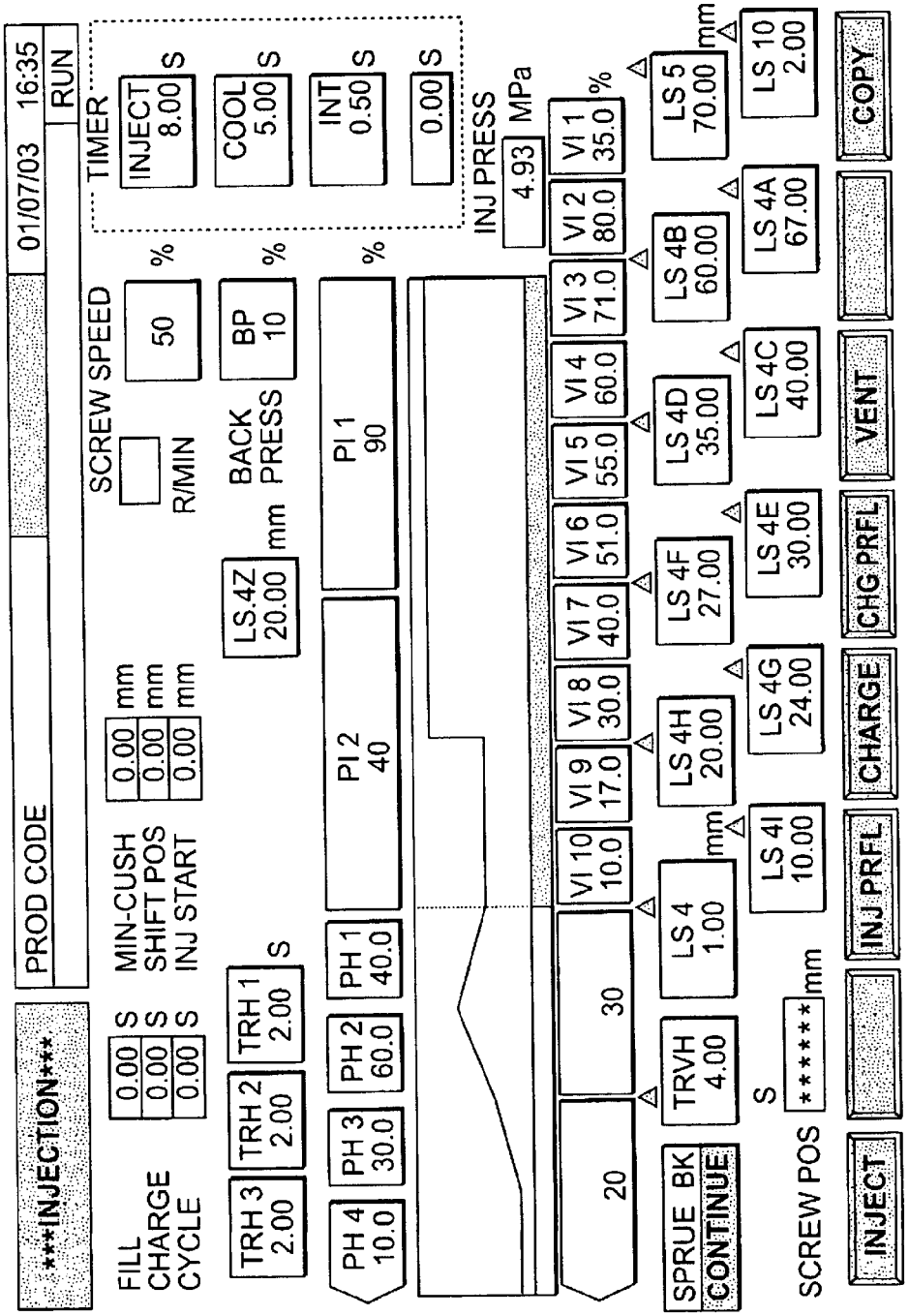
FIG. 5 shows a screen for setting an injection speed control pattern with the polygonal line mode in the conventional control system of the injection molding machine.

When the conventional program is required, the CPU 203 reads it out from the program memory 201. When the method of embodiments of the claimed inventions is required, the CPU 203 reads out a designated function and data as a variable, and calculates the values of the function. In the data memory 205, as shown in FIG. 2, the stroke position values of a position co-ordinate axis on each code and the injection speed values or injection pressure values corresponding to the stroke position values are stored. These pairs of values are the result of calculation by CPU 203 that uses the functions and are stored in a plurality of memory areas corresponding to each function.

The interface 207 sends data for injection screw drive control given from the CPU 203 to the command current generating device 211, and as mentioned, the stroke position data from the stroke position sensor 223 and the injection pressure data from the injection pressure sensor 225 to the CPU 203. Further, the data transmission between the CPU 203 and the interface 207 is a digital form, but the data transmission between the command current generating device 211, the stroke position sensor 223 and the injection pressure sensor 225, and the interface 207 is an analogue form. Accordingly, an instruction signal from the CPU 203 to the command current generating device 211 is converted to the form of analogue through the D/A converter 209 and is given to the command current generating device 211. In contrast, the signals given from the stroke position sensor 223 and the injection pressure sensor 225 are converted through the A/D converter 221 to digital form and are sent to the CPU 203 through the interface 207.

The D/A converter 209 operates so as to convert a digital signal from the CPU 203 to control the command current generating device 211 to an analogue signal.

The A/D converter 221 operates so as to convert analogue signals from the stroke position sensor 223 and the injection pressure sensor 225 to digital signals given to the CPU 203.

The command current generating device 211 operates so as to produce electric current for the electric servo motor 213 and the drive mechanism 217 of an injection screw.

The electric servo motor 213 is one of the power sources for the screw drive mechanism 217. Use of the electric servo motor 213 has advantages in precise, accurate and no time delay control for the screw drive mechanism 217, compared with a hydraulic motor.

The electromagnetic flow control valve 215 is one of the power sources for the screw drive mechanism 217. The injection screw is driven in accordance with the quantity of hydraulic pressure oil supplied from the valve 215. The hydraulic system including the valve 215 may be constituted at lower cost than to use the electric servo motor 213.

The screw drive mechanism 217 operates the injection speed control and the holding pressure control by adding a pressure holding mechanism not shown.

The stroke position sensor 223 has a function to detect a stroke position as an analogue signal, and the detected analogue signal is sent to the CPU 203 as a digital signal through the A/D converter 221.

The injection pressure sensor 225 also has a function to detect injection pressure as an analogue signal, and the detected analogue signal is sent to the CPU 203 as a digital signal through the A/D converter 221.

The above mentioned system of embodiments of the claimed inventions enables the operator to produce an injection control program by means of code input fashion, thereby allowing the operator to operate almost every kind of injection control pattern profile without making the program in advance.

Furthermore, because the function of a circle is stored in the program memory, and step numbers in the speed setting and the holding pressure setting are not limited, it is possible to operate both injection speed control and pressure holding control with a fashion of precise and freely defined profile that could not be achieved by the conventional arrangement of the rectangle, slope and polygonal line. Of course, the system of embodiments of the claimed inventions can be applied to the conventional type of injection control program without setting it again.

The method for setting an injection control pattern in the system is described referring FIG. 6 to FIG. 14.

Figure 6:
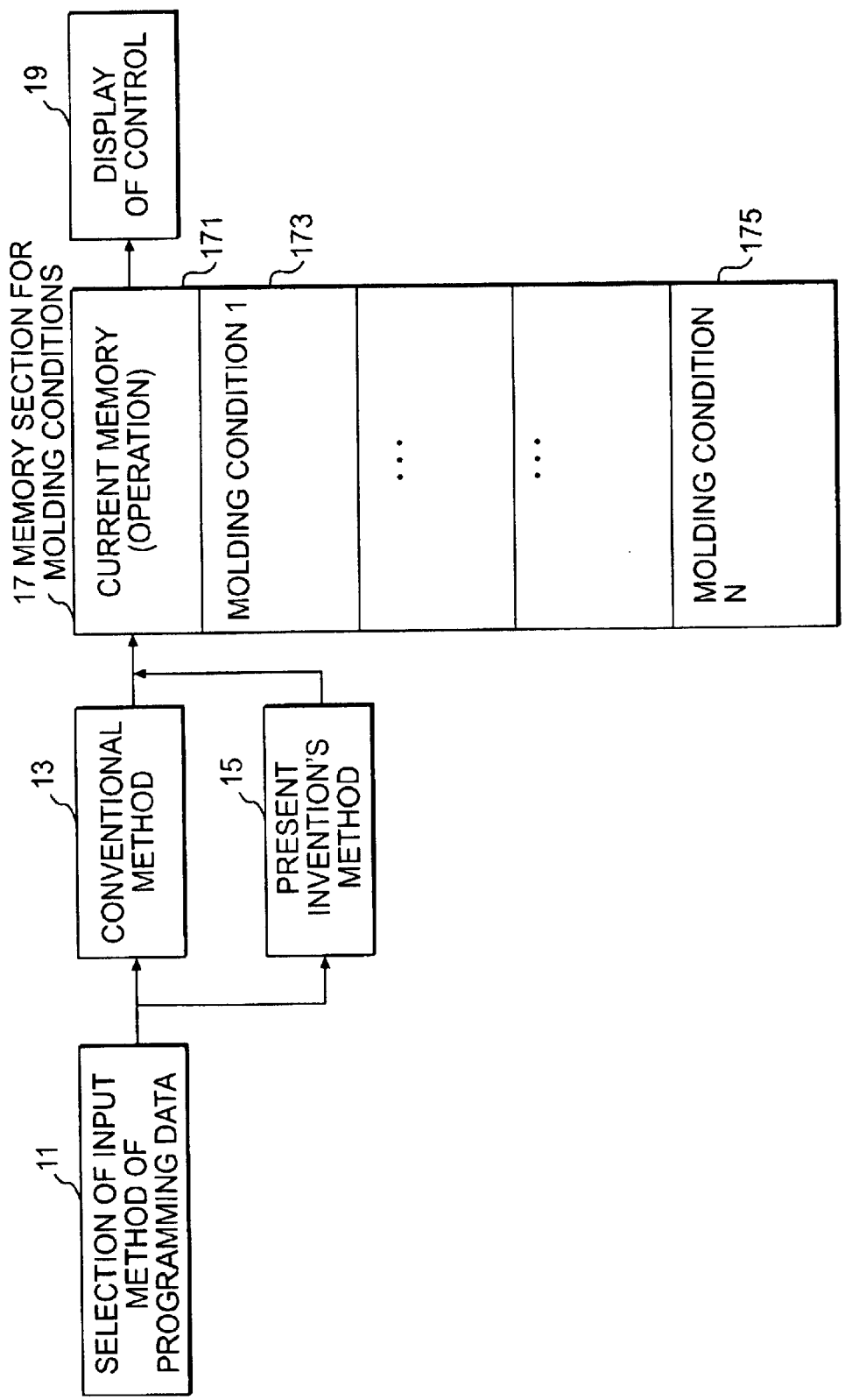
FIG. 6 is a flow chart for explaining injection molding machine control method in an embodiment of the claimed inventions.

FIG. 6 shows a flow chart for explaining injection molding machine control method in an embodiment of the claimed inventions.

In FIG. 6, a reference numeral 11 is a designation step of input type, that is, setting a method of injection control programs for a filling process and a pressure holding process, to select either the conventional setting method or an embodiment of the claimed setting method.

A reference numeral 13 is a step of the conventional setting method, and a reference numeral 15 is an embodiment of a step of the claimed setting method.

A reference numeral 17 is a step of storing data produced at the step 13 or the step 15 in a molding condition saving area of the data memory of a control apparatus on the injection molding machine.

A reference numeral 19 is a step of displaying injection control pattern profiles on a screen formed by the data saved in the molding condition saving area of the data memory.

In the step 13, setting of an injection speed, an injection pressure, a holding pressure, a time interval for the holding pressure and a switching position from the filling process to the pressure holding process can be done.

Figure 7:
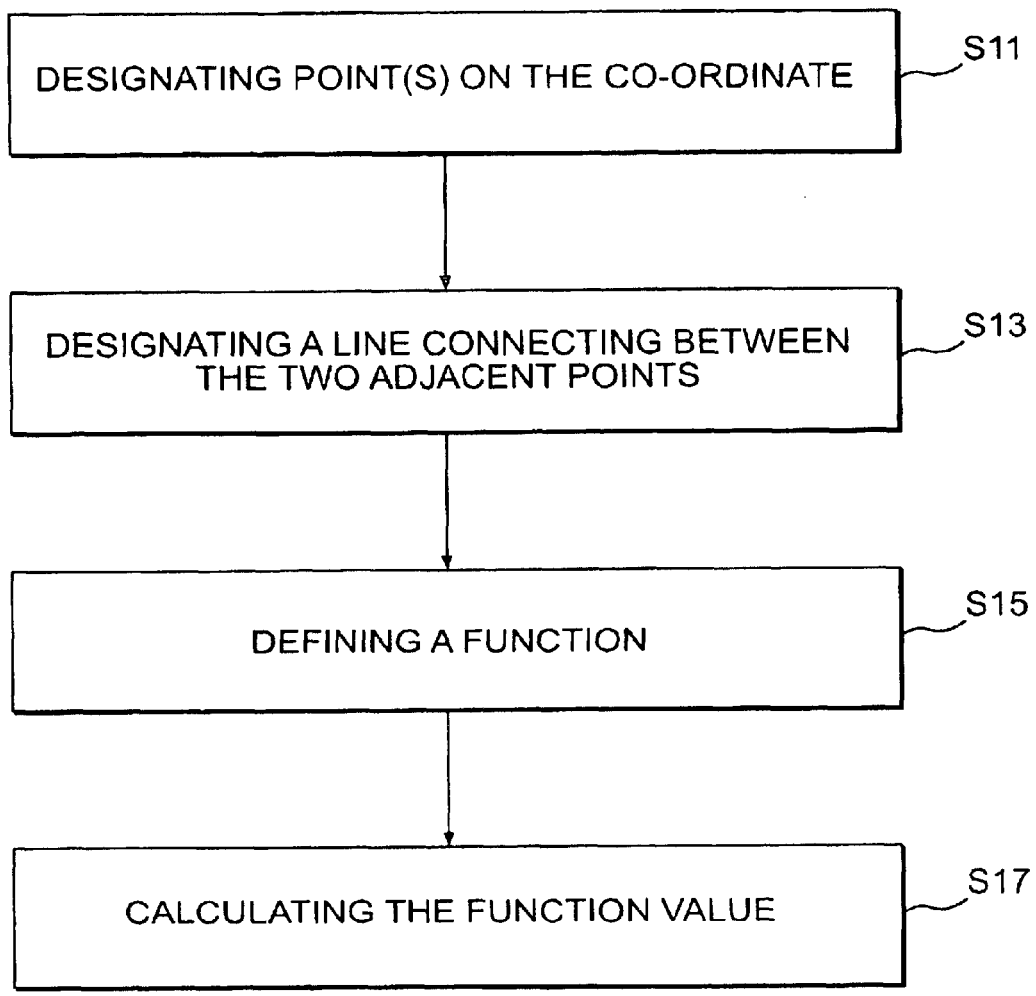
FIG. 7 is a flow chart for explaining a process of producing injection control data from co-ordinate point data on an injection control pattern.

In the step 15, there are two setting methods. The first method is generally shown in FIG. 7. In the case of a filling process, the method includes a designating step S11 for designating co-ordinate points, a first defining step S13 for defining a function suitable to a line connecting between two designated and adjacent points, such as a definite straight line or a sectional curve, the connecting line forming a portion of the pattern profile, a second defining step 15 for defining the function as a function to produce the injection speed data corresponding to the injection stroke position, and a calculating step S17 for calculating a plurality of injection speed data corresponding to each stroke position between the two designated points by using the function and saving the calculated data in a first area of the data memory.

In the designating step S11, one or a plurality of co-ordinate points on a plane with co-ordinate axes of an injection stroke position and an injection speed, respectively, each expressed as a point on the injection speed control pattern profile, are designated. The code data is formed with the name of each the co-ordinate axis and co-ordinate values at each designated point. This code data is saved in the data memory. The designation of co-ordinate points also can be done directly on the screen of the display device.

In the first defining step S13, a function suitable to a line connecting between two designated and adjacent points such as a definite straight line or a sectional curve is defined, the connecting line forming a portion of the injection control pattern profile. The sectional curve may be, e.g., an arc or a portion of a circle.

In the second defining step S15, the function is defined as a function to produce a plurality of injection speed data corresponding to each stroke position between the designated two points.

In the calculating step S17, a plurality of injection speed command data corresponding to each stroke position between the two designated points are calculated by using the function and saved in a first area of the data memory. The above steps S13 to S17 are executed in accordance with all the designated points forming one injection control pattern profile.

Accordingly, in the data memory all the injection speed control data on the one filling process is stored, that is, a series of pairs of data like the following are stored: $(X_1, Fa(X_1))$, $(X_2, Fa(X_2))$ ... $(X_N, Fa(X_N))$, $(X_{N+1}, Fb(X_{N+1}))$ ... $(X_{N+K}, Fb(X_{N+K}))$ ... $(X_{N+Z}, Fz(X_{N+Z}))$, where $X_1, X_2, X_N, X_{N+1}, X_{N+K}, X_{N+Z}$ represent stroke positions, and Fa, Fb, Fz represent different functions. The function Fa is defined in the stroke positions $X_1$ to $X_N$, and similarly, Fb is defined in $X_{N+1}$ to $X_{N+K}$.

The control apparatus controls the actual filling process by successively reading out each the pair of data (Xi, Fj(Xi)).

Those steps S11 to S17 are also applied to a setting method of the pressure holding process.

In the pressure holding process, the method includes a designating step S11 for designating co-ordinate points, a first defining step S13 for defining a function suitable to a line connecting between two designated and adjacent points, such as a definite straight line or a sectional curve, the connecting line forming a portion of the pattern profile, a second defining step 15 for defining the function as a function to produce the holding pressure command data corresponding to the time after switching from filling process to pressure holding process and a calculating step S17 for calculating a plurality of holding pressure command data corresponding to the time after switching from the filling process to the pressure holding process between the two designated points by using the function and saving the calculated data in a first area of the data memory.

In the designating step S11, one or a plurality of co-ordinate points on a plane with co-ordinate axes of time and holding pressure, respectively, each expressed as a point on the pressure holding control pattern profile, are designated. The code data is formed with the name of each co-ordinate axis and co-ordinate values at each designated point. This code data is saved in the data memory. The designation of co-ordinate points also can be done directly on the screen of the display device.

In the first defining step S13, a function suitable to a line connecting between two designated and adjacent points such as a definite straight line or a sectional curve is defined, the connecting line forming a portion of the pressure holding control pattern profile. The sectional curve may be, e.g., an arc or a portion of a circle.

In the second defining step S15, the function is defined as a function to produce a plurality of holding pressure command data corresponding to the time after switching from the filling process to the pressure holding process between the designated two points.

In the calculating step S17, a plurality of holding pressure command data corresponding to the time after switching from the filling process to the pressure holding process between the two designated points are calculated by using the function and saved in a first area of the data memory. The above steps S13 to S17 are executed in accordance with all the designated points forming one pressure holding control pattern profile.

Accordingly, all the pressure holding command data on the one pressure holding process is stored in the data memory.

The control apparatus controls the actual pressure holding process by successively reading out each pair of data (Ti, Fj(Ti)), where Ti represents the time elapsed after switching from the filling process to the pressure holding process, and Fj represents a kind of function.

Figure 9:
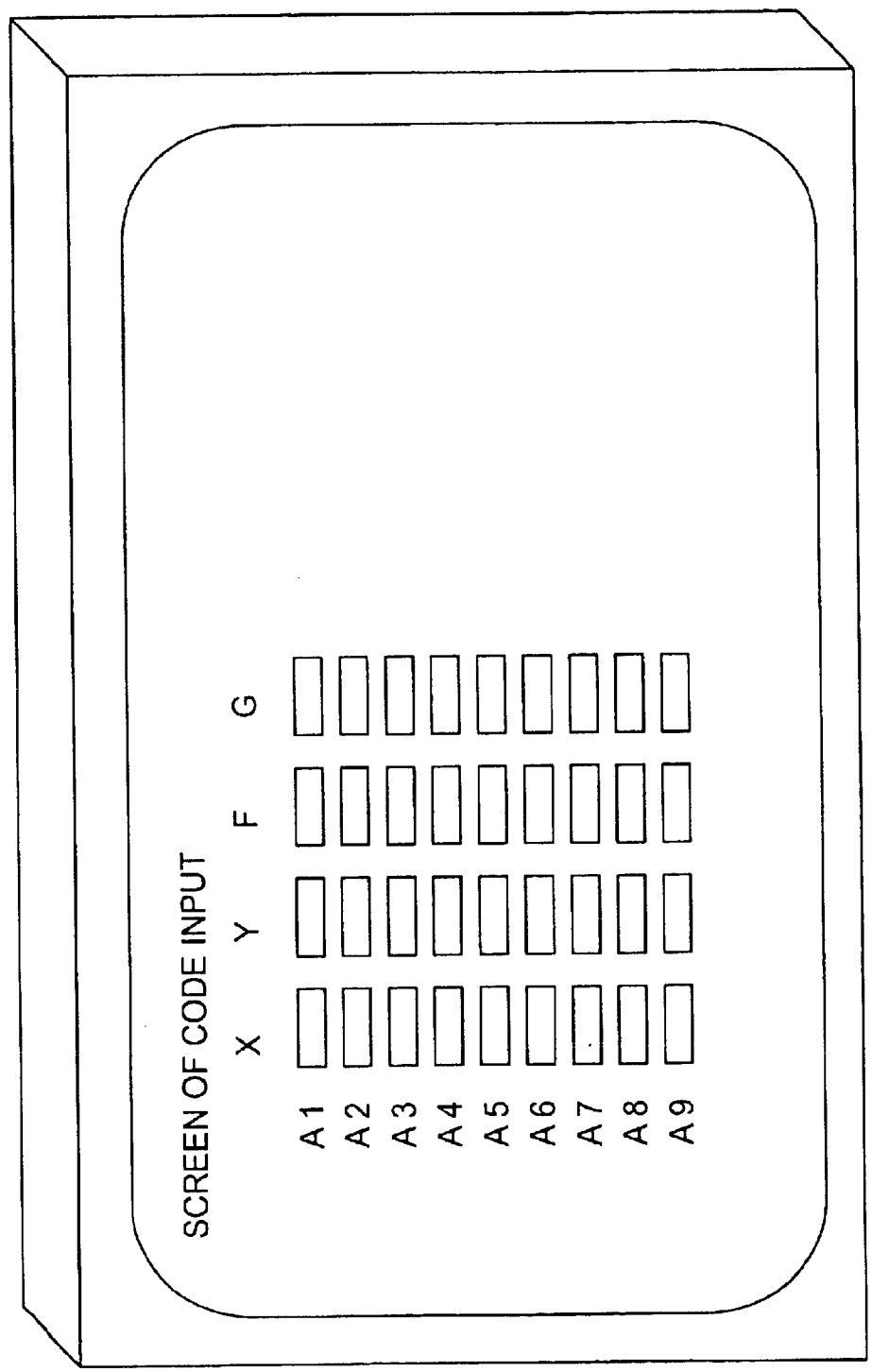
FIG. 9 shows a first input screen for setting an injection control data with codes in an embodiment of the claimed inventions.
Figure 12:
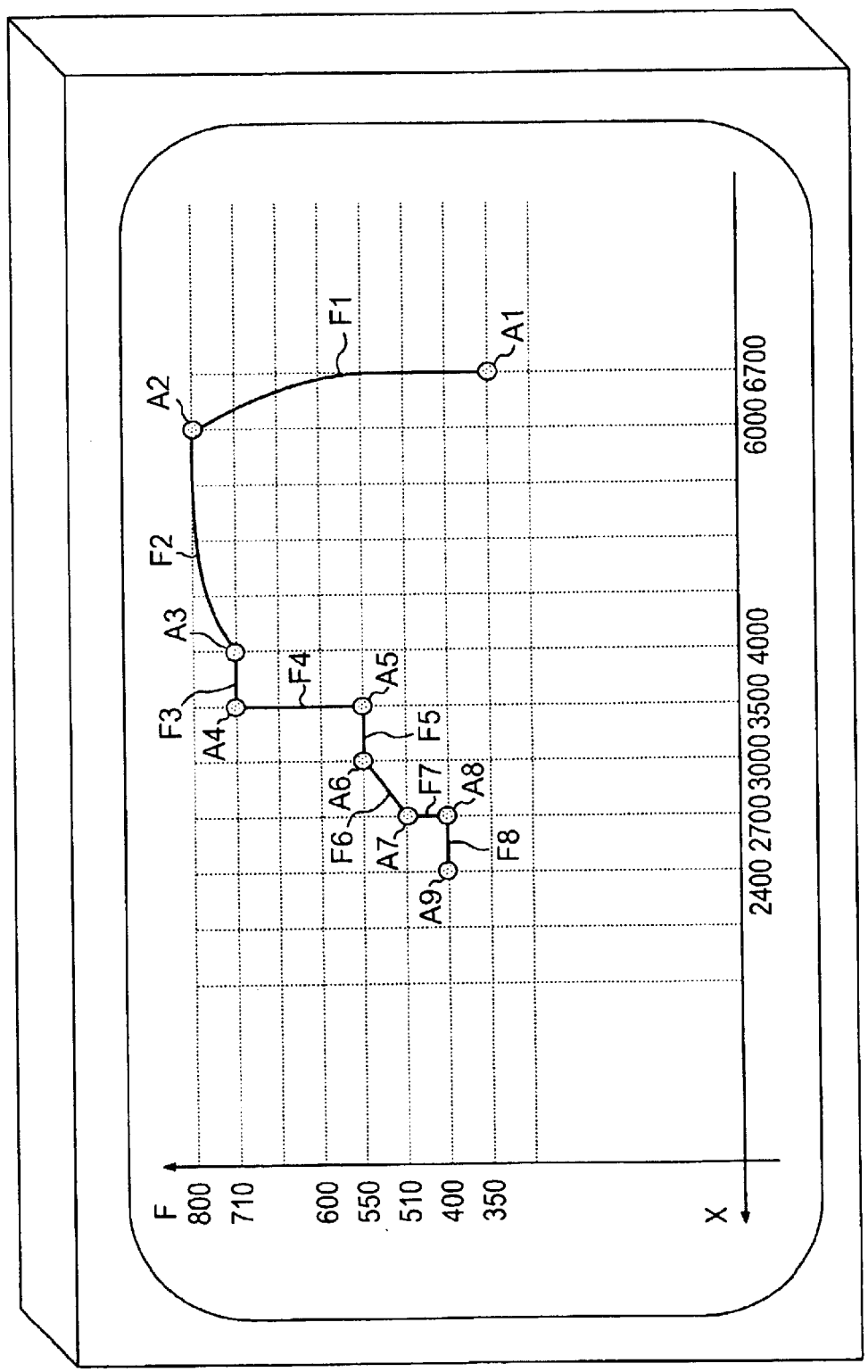
FIG. 12 shows an output screen for displaying a relationship between an injection stroke position and injection speed set on the first input screen in an embodiment of the claimed inventions.

FIG. 9 is an input screen for a code input method in which a group of instruction data at each sectional stroke position is input. In FIG. 9, as input parameters, the stroke position X, the holding pressure Y, the injection speed F and function parameter G are expressed on the top of each column. A1 to A9 represent the sectional points as shown in FIG. 12. Though the number of the sectional points are 9 on the screen, it is not limited to 9. For example, on the next screen A10 to A19 may be displayed. The function parameter G is either one function of the rectangle, the slope, the polygonal line and the circle, which is defined as the function representing injection speed to the stroke position in the embodiment.

The sample of the code input method for producing an injection control program are as followings.

| | | | |
|---|---|---|---|
| 1) | X6700 | Y90 | F350 (first step of speed) | G02(arc mode) |
| 2) | X6000 | Y90 | F800 (second step of speed) | G02(arc mode) |
| 3) | X4000 | Y90 | F710 (third step of speed) | G01(rectangle mode) |
| 4) | X3500 | Y90 | F600 (fourth step of speed) | G01(rectangle mode) |
| 5) | X3000 | Y90 | F550 (fifth step of speed) | G04(polygonal mode) |
| 6) | X2700 | Y90 | F510 (sixth step of speed) | G01(rectangle mode) |
| 7) | X2400 | Y90 | F400 (seventh step of speed) | G01(rectangle mode) |

In the above code input method, the injection stroke position X, the injection speed F, the injection pressure Y and the shape mode including sectional curve (arc) can be designated.

FIG. 12 illustrates an injection speed control pattern profile displayed on the screen, which is produced in the control apparatus from the data input through the above code input method.

In FIG. 12, sectional curves F1 and F2 are arcs which could not be produced and displayed in the conventional injection control apparatus.

It is possible to control the injection speed in a precise and correct way since the operator is capable of easily designating the arc as a portion of the injection speed control pattern profile through the code input method of the claimed inventions.

Figure 10:
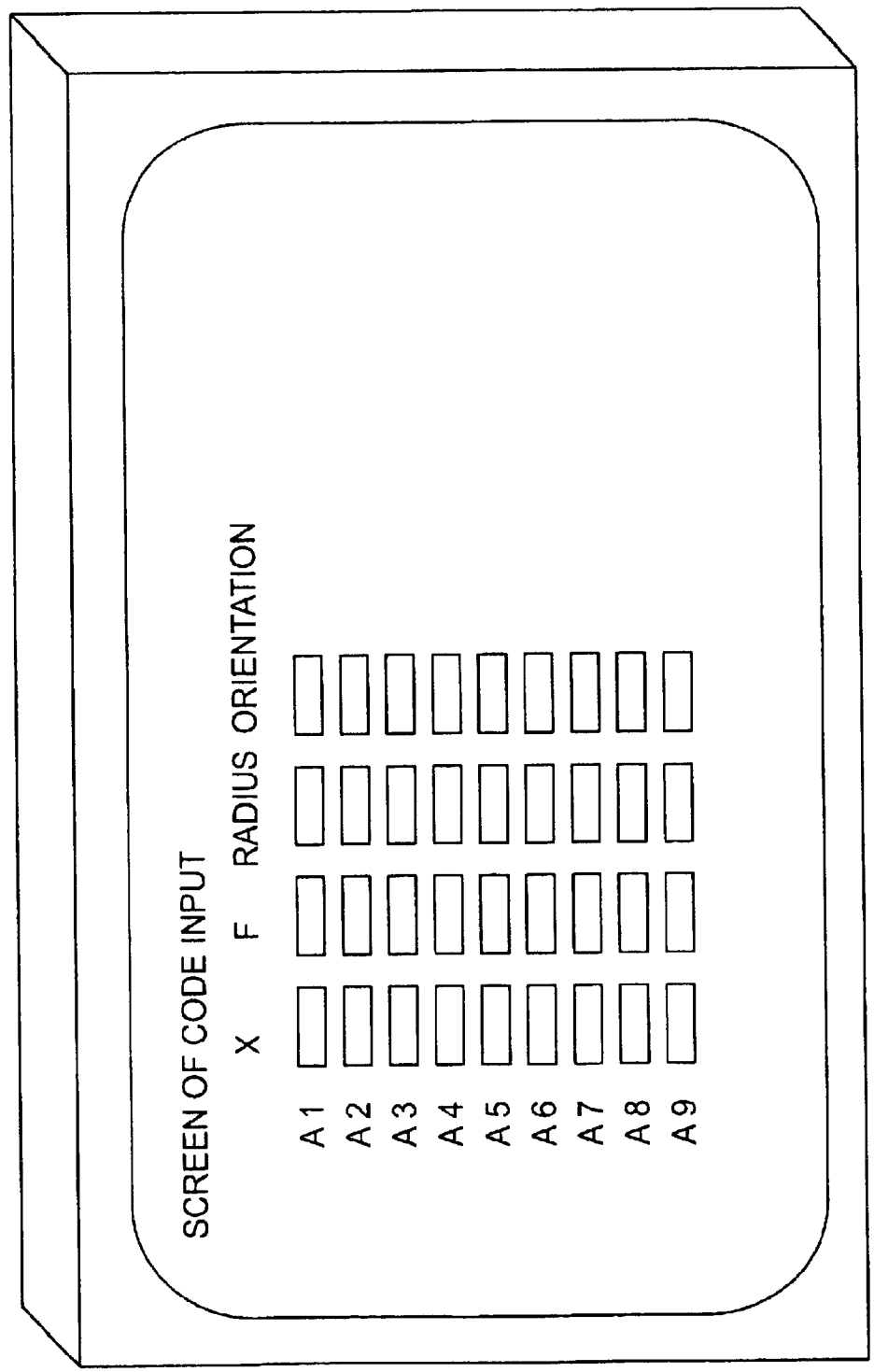
FIG. 10 shows a second input screen for setting an injection control data with codes in an embodiment of the claimed inventions.

Another code input method of the claimed inventions is shown in FIG. 10.

Figure 13:
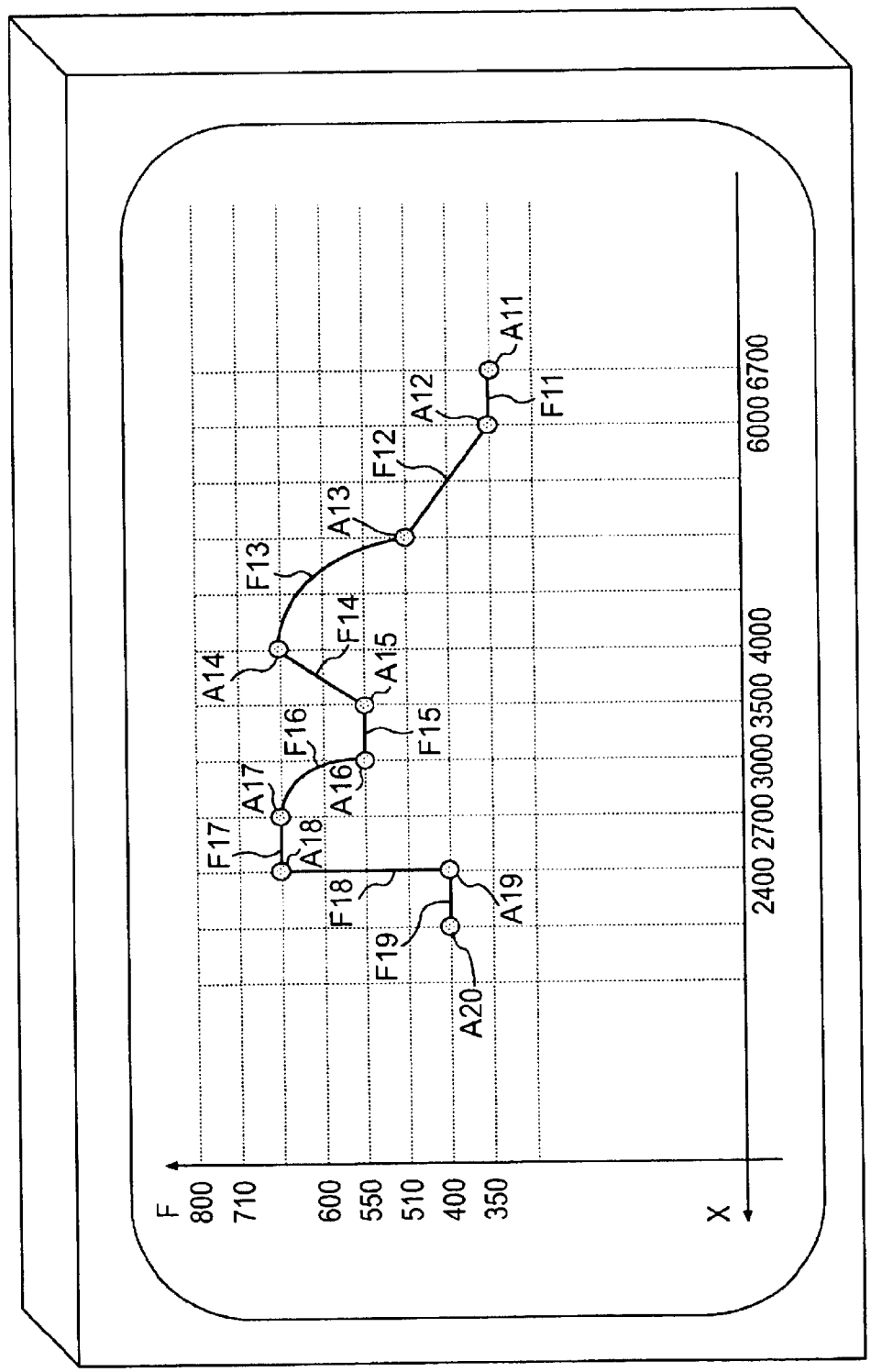
FIG. 13 shows an output screen for displaying a relationship between an injection stroke position and injection speed set on the second input screen in an embodiment of the claimed inventions.

In FIG. 10, as input parameters, the stroke position X, the injection speed F, the radius of arc RADIUS and the Orientation are input on the screen, where the orientation means the arc is upward or downward. In this method, a point on the pattern profile is defined as a combination of the position and the speed like (X1, F1), (X2, F2) ..., and the instruction wave form (a profile portion) between the two adjacent points is defined by functions predeterminedly stored in the program memory 201 such as the linear line, the slope, the flat and the arc. The result is displayed on the screen of the input device 204. Then, the CPU 203 calculates values of the function at each position on the wave form, and the calculated values Fi(xi) at each position xi are sent to the data memory and stored there. FIG. 13 is a profile display on the screen produced by the input data through another code input method. It is also possible to control the injection speed in a precise and correct way since the operator is capable of easily designating the arc as a portion of the injection speed control pattern profile through another code input method of the claimed inventions.

FIG. 8 shows a screen for selecting an injection control pattern of shape mode in the control display step 19 in the method of the claimed inventions.

In FIG. 6, the molding condition storing step 17 is executed after the step 13 or the step 15 is done. Namely, in the step 17, the input code data given by the step 15 are saved in the current memory 171. Other memory areas including 173 and 175 are provided with the accumulated molding condition data concerning various kinds of mold products molded in the past, such data being classified and stored as molding conditions 1 to N. Of course, these stored data can be modified.

In the pressure holding process, such as the filling process mentioned above, the code input method is utilized.

Figure 11:
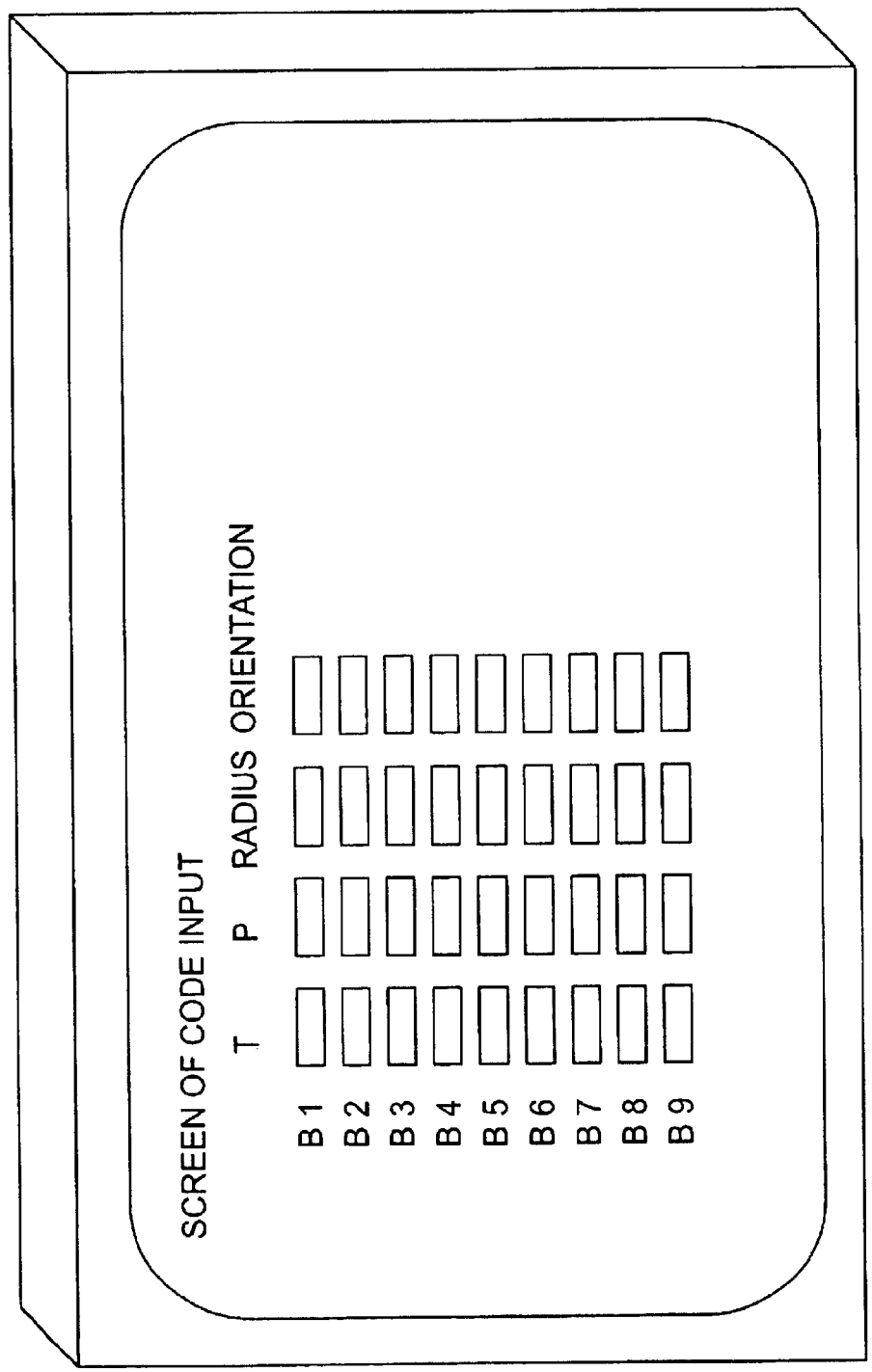
FIG. 11 shows an input screen for setting holding pressure control data with codes in an embodiment of the claimed inventions.

As displayed on the input screen of FIG. 11, code parameters are the time T, the holding pressure P at the time T, the radius RADIUS of the arc and the Orientation of the arc. A point on the pressure holding control pattern profile is defined as a combination of the time and the pressure like (T1, P1), (T2, P2) . . . , and the instruction wave form (a profile portion) between the two adjacent points is defined by functions predeterminedly stored in the program memory 201. FIG. 14 shows a graph representing a holding pressure control pattern profile on the screen produced by the input data through another code input method of the claimed inventions, shown in FIG. 11. In FIG. 14, the abscissa corresponds to the time T and the ordinate corresponds to the pressure P.

Thus, each selected injection control program is displayed on the control display device 19, the contents of which are set in the data memory. In the method for setting the input code data according to the claimed inventions, the input code data is defined by a programming language based on a numerical control code with a time series fashion and applied only to the filling process and the pressure holding process. In other words, the input code data and the injection speed command data or the pressure holding command data produced by using the function through the input code data are independent from other controls such as die position control, machine operation start and stop control and temperature control, etc., and not influenced by them. Accordingly, it is possible to form an injection control program by combining and/or repeating the shape modes freely. Furthermore, it is easily achieved that in one injection control pattern profile, a plurality of shape modes is defined.

According to the injection control program produced by using the input and setting method of the claimed inventions, a highly qualified molding operation suitable to the characteristics of a mold product is smoothly achieved.

Also, even in the form of job shop type production by frequent changing of mold dies, a highly qualified molding operation suitable to the characteristics of a mold product can be achieved smoothly with high speed.

As described above, the setting method of an injection control program of the claimed inventions allows one to smoothly achieve a highly qualified molding operation suitable to the characteristics of a mold product, because in the filling and pressure holding processes, each having a plurality of injection speed steps and a plurality of pressure holding steps with a plurality of shape modes such as the rectangle, the slope, the polygonal line and the arc, the setting method for the injection speed control pattern and pressure holding control pattern are executed in a manner that data for those control patterns are set by using the input code data defined by a programming language based on a numerical control code with a time series fashion and particularly, using the arc as the shape mode.

Furthermore, though in the conventional method of setting there is a limitation in the number of steps of injection speed and of holding pressures, there is not such a limitation in the method of the claimed inventions.

Accordingly, the injection speed may be changed at a level of minimum resolution of the stroke position, and also, the holding pressure may be changed at a level of minimum resolution of time.

Further, in the conventional method of setting, it is impossible to define one injection control pattern profile with a plurality of shape modes. On the contrary, in the claimed inventions it is possible to define it with a mixed mode.

In the conventional method of setting, any shape modes comprise only a straight line such as rectangle, slope and polygonal line. On the contrary, in the claimed inventions, it is possible to define the pattern profile with a curve like the arc.

It should be understood, of course, that the foregoing disclosure relates only to preferred embodiments of the invention, and that it is intended to cover all changes and modifications of the example of the invention herein chosen for the purpose of the disclosure which does not constitute departures from the spirit and scope of the invention set forth in the appended claims.

What is claimed is:

1. A method for setting an injection speed control pattern profile into a memory of a control apparatus of an injection molding machine, in which a series of stroke position command data necessary for operating one injection filling process are stored together with injection speed command data corresponding to each position, and a plurality of functions for producing each injection speed command data are also stored, the control apparatus controlling actual filling operations by reading out the data in the memory, said method comprising:

designating a plurality of co-ordinate points on a plane with co-ordinate axes of an injection stroke position and an injection speed, respectively, each as a point on the injection speed control pattern profile;

defining a function suitable to a line connecting between two designated and adjacent points such as a definite straight line or a sectional curve, said connecting line forming a portion of the pattern profile;

defining said function as a function to produce the injection speed command data corresponding to the stroke position;

calculating a plurality of injection speed command data corresponding to each stroke position between the two designated points by using said function; and storing the calculated data in a first area of memory.

2. A method for setting an injection speed control pattern profile according to claim 1, wherein said designated point on the plane is defined by a code data including a code name corresponding to each co-ordinate axis and a value of the point on the axis, and a plurality of said code data are stored in a second area of the memory sequentially.

3. A method for setting an injection speed control pattern profile according to claim 1, wherein said designating step is executed by direct input on a screen for display.

4. A method for setting an injection speed control pattern profile according to claim 1, wherein said sectional curve is an arc.

5. A method for setting a holding pressure control pattern profile into a memory of a control apparatus of an injection molding machine, in which a series of time command data necessary for operating one pressure holding process are stored together with a series of holding pressure command data corresponding to each time, and a plurality of functions for producing each holding pressure command data are also stored, said control apparatus controlling actual pressure holding operations by reading out the stored data in the memory, said method comprising:

designating a plurality of co-ordinate points on a plane with co-ordinate axes of the time and the holding pressure, respectively, each as a point on the holding pressure control pattern profile;

defining a function suitable to a line connecting between two designated and adjacent points such as a definite straight line or a sectional curve, said connecting line forming a portion of the pattern profiled;

defining said function as a function to produce the holding pressure command data corresponding to each time between the two designated points;

calculating a plurality of holding pressure command data corresponding to each the time by using said function; and storing the calculated data in a first area of the memory.

6. A method for setting a holding pressure control pattern profile according to claim 5, wherein said designated point on the plane is defined by a code data including a code name corresponding to each co-ordinate axis and a value of the point on the axis, and a plurality of said code data are stored in a second area of the memory sequentially.

7. A method for setting a holding pressure control pattern profile according to claim 5, wherein said designating step is executed by direct input on a screen for display.

8. A method for setting a holding pressure control pattern profile according to claim 5, wherein said sectional curve is an arc.

9. A method for setting an injection control pattern profile into a memory of a control apparatus of an injection molding machine, said method comprising:

designating a point on the injection control pattern profiled;

forming a code data of the point defined by a programming language based on a numerical control code with a time series fashion; and storing the code data into the memory.

* * * * *